July 5, 1960     B. E. NYE ET AL     2,943,826

LANDING GEAR SHOCK ABSORBER SYSTEM

Filed April 14, 1955

INVENTORS
BENJAMIN E. NYE
BY IRA D. SMITH

ATTORNEY

United States Patent Office 2,943,826
Patented July 5, 1960

2,943,826

LANDING GEAR SHOCK ABSORBER SYSTEM

Benjamin E. Nye, Parma, and Ira D. Smith, Bedford, Ohio, assignors to Cleveland Pneumatic Industries, Inc., a corporation of Ohio Filed Apr. 14, 1955, Ser. No. 501,397

4 Claims. (Cl. 244—104)

This invention relates generally to aircraft landing gear and more particularly to a new and improved landing gear system which effectively controls resonant vibration of the aircraft on the ground without ratcheting.

Particularly in helicopters, difficulty has occurred in designing landing gears which will damp out the violent resonant vibrations set up when a ship is on the ground with the rotor turning. A rotating rotor creates vibration impulses which, if they occur in the range of resonance frequency, cause resonant vibrations which can and have caused the helicopter to tip over on the ground. When sufficient damping has been provided in the shock absorber mechanism to control or eliminate this resonant vibration, a second problem has become dominant, that of ratcheting. Ratcheting is the phenomenon which causes the landing gear struts to become fully compressed while the ship is on the ground. This phenomenon occurs when the damping action produced by the shock absorber unit is great enough to prevent the spring of the strut from extending the strut through a distance at least equal to the distance of compression during a single cycle of vibration. In other words, in a single cycle of vibration the shock absorber will prevent rebound of the strut through the same stroke as the compression so each cycle of the vibration will cause the strut to be compressed a little more until the strut is in the fully compressed position.

It is an important object of this invention to provide a landing gear having means preventing ratcheting.

It is another object of this invention to provide an aircraft landing gear system which permits the use of essentially any desired amount of vibration damping without the attendant difficulty of ratcheting.

It is still another object of this invention to provide an aircraft landing gear system wherein a high degree of damping is provided for resisting the motion of the strut in any position of compression and wherein means are provided to prevent the occurrence of the ratcheting.

It is still another object of this invention to provide an aircraft landing gear system wherein uniform positive damping is incorporated which resists extension and compression of the strut regardless of the strut position.

It is still another object of this invention to provide a double-acting shock absorber with means to prevent overloading of the shock absorbing during landing impacts.

It is still another object of this invention to provide a double-acting aircraft shock absorber strut wherein means are provided to eliminate the damping when the aircraft takes off so that the strut will move to the extended position rapidly.

It is still another object of this invention to provide a double-acting aircraft shock absorber strut wherein means are provided to prevent excessive strains on the shock absorber during the impact occurring when the aircraft lands.

It is still another object of this invention to provide an air-oil shock absorber strut combining a metering pin effective in resisting impact loading during the landing operation in combination with an integral double-acting shock absorber particularly adapted to resist vibration.

Further objects and advantages will appear from the following description and drawings, wherein.

Figure 1:
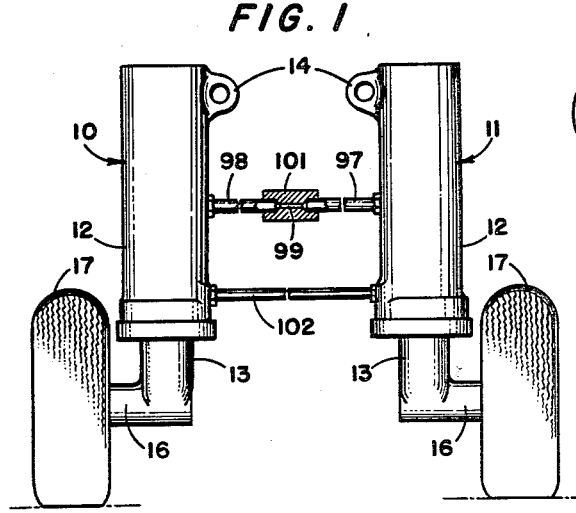
Figure 1 is a diagrammatic view of a landing gear system according to this invention illustrating the preferred cross connection used between the two struts of the landing gear.

Referring to the drawings, Figure 1 shows the complete landing gear mechanism which includes two shock absorbing struts 10 and 11 which are structurally similar. Each of the struts 10 and 11 is provided with upper and lower telescoping members 12 and 13 respectively. A mounting boss 14 on each of the upper telescoping members 12 is adapted to be connected to the aircraft frame and each of the lower telescoping members 13 are provided with a laterally extending axle 16 on which a wheel 17 is journaled. Since the two struts of the complete gear are structurally identical, the structure of only the strut 11 will be discussed in detail but it should be understood that the strut 10 has all of the structural components described.

Figure 2:
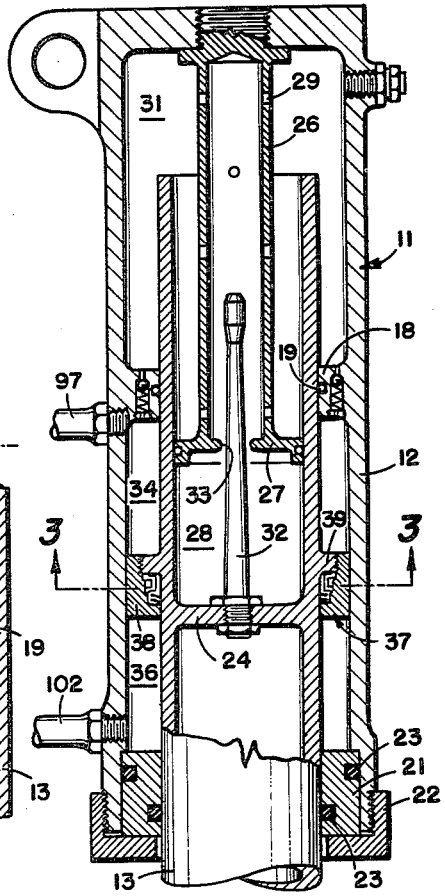
Figure 2 is a longitudinal section of the preferred strut structure.

Referring to Figure 2, the upper telescoping member 12 is formed with a diameter sufficiently large to receive the lower telescoping member 13 and provide substantial clearance between the members. The upper telescoping member 12 is formed with an inwardly extending flange or bulkhead 18, the inner surface of which engages the outer surface of the lower telescoping member 13 to provide a lateral bearing support. A seal 19 prevents leakage of fluid between the bulkhead 18 and the lower telescoping member 13. A bearing and gland member 21 is mounted on the lower end of the upper telescoping member 12 by a flange nut 22 threaded on the upper telescoping member. Hydraulic seals 23 prevent fluid leakage between the gland member 21 and the two telescoping members 12 and 13.

A plunger tube 26 formed with an orifice plate 27 at its lower end is mounted on the upper telescoping member 12. This plunger tube cooperates with a bulkhead 24 formed on the lower telescoping member 13 to define a first fluid chamber 28. The plunger tube 26 is formed with a plurality of radial passages 29 which provide fluid communication between the interior of the plunger tube 26 and a second fluid chamber 31 above the bulkhead 18. A metering pin 32 is mounted on the bulkhead 24 and extends upwardly through an orifice 33 formed in the orifice plate 27. The metering pin 32 is contoured to provide a variable resistance to the flow of hydraulic fluid from the first chamber 28 to the second chamber 31 through the orifice 33. The chamber 28 is completely filled with oil and the lower portion of the chamber 31 contains oil even when the strut is in the extended position. The remaining portions of the chamber 31 are charged with a gas under pressure which pressure results in a reaction force between the two telescoping members resiliently urging the lower telescoping member 13 downwardly relative to the upper telescoping member 12 toward the extended position. This pressure of the gas which of course is transmitted to the hydraulic fluid within the chambers 28 and 31 results in an air-oil spring which is utilized to support the weight of the aircraft when the aircraft is on the ground. Of course, axial motion of the lower telescoping member 13 upwardly relative to the upper telescoping member 12 causes a decrease in the volume of the chamber 28 which increases the pressure of the hydraulic fluid contained therein. This causes the fluid to flow through the orifice 33 to the second chamber 31 which flow absorbs energy and provides shock absorption. The metering pin 32 is contoured to provide the desired amount of damping through the entire stroke of the mechanism.

Figures 6, 7:
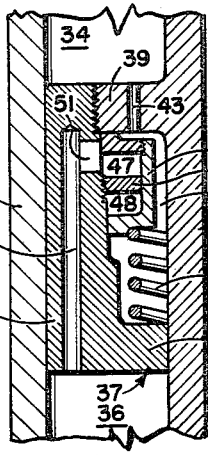
Figure 6 is an enlarged fragmentary longitudinal section taken along 6—6 of Figure 3; and, Figure 7 is an enlarged fragmentary longitudinal section taken along 7—7 of Figure 3.
Figure 3:
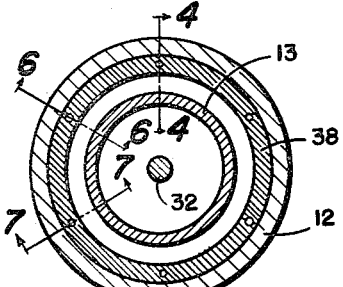
Figure 3 is a cross section taken along 3—3 of Figure 2.

The space around the lower telescoping member 13 between the bulkhead 18 and the gland member 21 is divided into upper and lower chambers 34 and 36 respectively by a piston assembly 37 mounted on the lower telescoping member 13. The piston assembly 37 comprises a piston member 38 threaded on a radially extending flange 39 formed on the lower telescoping member 13. The piston member 38 and the lower telescoping member 13 define a fluid chamber 42 in fluid communication with the upper chamber 34 through a plurality of axial passages 43 formed in the flange 39. An annular slide valve assembly 44 having a U-shaped section is positioned within the chamber 42 and is adapted to slide axially along the inner wall of the piston member 38. A bulkhead 46 mounted on the piston member 38 divides the cavity within the slide valve 44 into a first chamber 47 and a second chamber 48. Fluid communication is provided between the lower chamber 36 and the first chamber 47 by an axially extending passage 49 and a cross passage 51 formed in the piston member 38 (see Figure 7). However the cross passage 51 is isolated from the chamber 42 when the slide valve 44 is in the upper position shown. A spring 52 extends between the slide valve 44 and an inwardly extending flange 53 formed on the piston member 38 and resiliently biases the slide valve toward the upper position.

A pilot valve 54 (shown in Figure 6) is utilized to operate the slide valve 44. This pilot valve is positioned within a bore 56 formed in the piston member 38 and is normally urged against a valve seat 57 formed at the junction between the bore 56 and a passage 58 open at its upper end to the upper chamber 34. A spring 59 extends between a retaining member 61 threaded into the bore 56 and the pilot valve 54 and urges the pilot valve into engagement with the seat 57. The lower end of the pilot valve 54 is formed with an enlarged guide portion 63 which closely fits the bore 56 and separates the bore 56 into an upper zone 64 and a lower zone 66. A cross bore 62 provides fluid communication between the upper zone 64 and the second chamber 48. A small bleed 67 formed in the outer surface of the guide portion 63 provides a restricted flow connection between the upper zone 64 and the lower zone 66. A through bore 68 in the retaining member 61 provides fluid communication between the lower zone 66 and the lower chamber 36.

The pilot valve 54 in combination with the slide valve 44 operates to relieve excessive pressures within the chamber 34 which occur during the landing impact of the aircraft. When the pressure within the chamber 34 exceeds a predetermined value, the pilot valve is moved by this pressure downwardly against the spring 59 thus bringing the second chamber 48 into fluid communication with the upper chamber 34. The fluid under pressure within the chamber 48 moves the slide valve 44 downwardly relative to the piston member 38 bringing the cross passage 51 into communication with the fluid chamber 42, thus permitting flow of hydraulic fluid through the passages 43, 51 and 49 to the lower chamber 36. This, of course, relieves the excessive pressure within the chamber 34. As soon as the pressure is relieved, the pilot valve 54 returns to its closed position and the hydraulic fluid within the chamber 48 is drained into the chamber 36 through the bleed 67 and the bore 68 thereby permitting the slide valve to return to its upper position. Of course, variations of the fluid pressure within the fluid chamber 42 do not produce any movement of the slide valve 44 because the forces on the valve due to the fluid in this chamber are balanced.

Figures 4, 5:
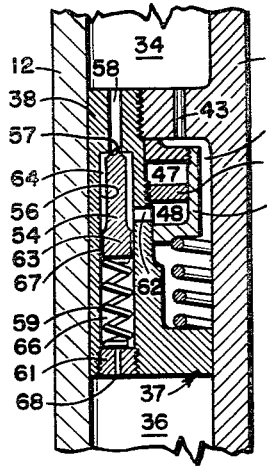
Figure 4 is an enlarged fragmentary longitudinal section taken along 4—4 of Figure 3.
Figure 5 is an enlarged fragmentary longitudinal section of the ball check valve structure connecting the main shock absorbing chamber and the secondary shock absorbing chambers.

A poppet valve assembly (shown in Figure 4) is also provided within the piston member 38 to establish communication between the chambers 34 and 36 when the aircraft leaves the ground so that the strut may move to the extended position under the influence of the air-oil spring described previously. The piston member 38 is formed with an axially extending bore 71, the lower end of which opens into the lower chamber 36 and the upper end of which is in communication with the upper chamber 34 through a passage 72.

First, second and third disc members 73, 74 and 76 respectively, are mounted in the bore 71 and cooperate with the bore to define a dash pot chamber 77 and a valve chamber 78. A poppet valve 79 extends through the disc members 73, 74 and 76 and is exposed on its lower end face to the fluid in the chamber 36 and on its upper end face to a pressure equal to the pressure in the chamber 34. A dash pot disc 81 mounted on the poppet valve 79 divides the dash pot chamber 77 into an upper zone 82 and a lower zone 83 but provides restricted fluid communication through small orifices 84 formed therein. A light spring 86 extends between the disc member 73 and the dash pot disc 81 and biases the poppet valve 79 toward its lower position at which time the lower chamber 36 is isolated from the valve chamber 78. A cross passage 87 provides fluid communication between the valve chamber 78 and the fluid chamber 42 which is always in communication with the upper chamber 34. When the aircraft takes off and leaves the ground, the pressure within the chamber 36 is substantially greater than the pressure within the chamber 34 due to the force created by the air spring urging the strut toward the extended position. This higher pressure within the lower chamber 36 after take off creates a force acting on the poppet valve 79 urging it upwardly relative to the piston member 38. Since this force operates over a substantial period of time, the poppet valve 79 moves upwardly against the resistance of the dash pot disc 81 until it clears the disc member 76 and brings the lower chamber 36 into fluid communication with the valve chamber 78 thereby permitting fluid flow from the lower chamber 36 to the upper chamber 34. This permits the strut to move to the extended position. However, the poppet valve 79 will not open during resonant vibrations because the pressure in the chamber 36 is not greater than the pressure in the chamber 34 for long enough periods of time to overcome the resistance of the dash pot.

The bulkhead 18 (see Figure 5) is formed with a bore 91 and a smaller bore 92 terminating at its lower end in a valve seat against which a ball check valve 93 seats. A spring 94 extends between the ball check valve 93 and a spring retainer 96 and urges the ball check valve against its seat. This ball check valve assembly is utilized to insure that the upper and lower chambers 34 and 36 are both filled with relatively incompressible hydraulic fluid at all times. If any leakage occurs from the chambers 34 or 36, a vacuum will be present in the chambers which will cause oil to flow from the chamber 31 into the upper chamber 34. However, reversed flow from the chamber 34 to the chamber 31 is prevented by the check valve.

A hydraulic line 97 is connected to the upper chamber 34 of the strut 11 and a similar hydraulic line 98 is connected to the chamber 34 of the strut 10. Both of the hydraulic lines 97 and 98 are connected through a metering orifice 99 in a flow restriction member 101. The lower chambers 36 of each of the struts 10 and 11 are connected by means of a hydraulic line 102.

In operation, both of the struts 10 and 11 are extended when the aircraft touches the ground in a landing. During the landing impact the pilot valve 54 opens and operates the slide valve 44 thus bringing the upper chamber 34 and the lower chamber 36 into fluid communication. The air-oil spring in combination with the metering pin 32 and orifice 33 absorbs the energy of the impact until the aircraft comes to rest at the static position. At this time the pilot valve 54 and the slide valve 44 both move in response to the force of the springs 59 and 52 respectively, to the closed position and the chambers 34 of each strut are isolated from the chambers 36. If lateral vibrations are set up in the aircraft due to rotor rotation or any other cause, there will be vertical relative motion between the upper and lower telescoping members 12 and 13. These lateral vibrations will tend to compress one of the struts 10 or 11 and extend the other causing a lateral shift of weight from one strut to the other. Assuming that the shift of weight is toward the strut 11, there will be a downward movement of the upper telescoping member 12 relative to the lower telescoping member 13 which will reduce the volume of the upper chamber 34. This will cause hydraulic fluid to flow through the hydraulic line 97, through the metering orifice 99 and the hydraulic line 98 into the upper chamber 34 of the strut 10. This will create a force on the piston assembly 37 of the strut 10 which augments the force of the air-oil spring and assists in extending the strut. This extension of the strut will cause the chamber 36 of the strut 10 to be reduced in volume and produce hydraulic flow through the line 102 into the lower chamber 36 of the strut 11. The flow of the hydraulic fluid through the metering orifice 99 absorbs energy and dampens out the vibration. However, since the chambers 34 are completely isolated from the chambers 36 during this vibration, the total volume within the two chambers 34 and the total of the volume within the two chambers 36 remains constant. It is, therefore, impossible for the struts to ratchet either up or down. For this reason a large amount of flow resistance may be incorporated into the metering orifice 99 so that a large amount of energy will be absorbed without ratcheting. Because the poppet valve 79 is controlled by the dash pot, it does not open during the high frequency vibrations so the chambers 34 and 36 do not come into fluid communication through this valve. Also the spring 59 on the pilot valve 54 is set in such a manner that it will not open under the pressures which occur during resonant vibration of the landing gear. It should also be noted that the cross connection between the chambers 34 of the struts 10 and 11 insure that the strut 10 extends through a distance equal to the distance the strut 11 compresses and prevents the wheel 17 on the strut 10 from leaving the ground. When the shift is toward the strut 10, the same cross connection will result in an extension of the strut 11 in a similar manner.

When the aircraft takes off, it is necessary to establish the fluid communication between the chambers 34 and 36 so that the struts may move to their extended position and be available to absorb the impact shock of the next landing. After take-off, the pressure within the lower chamber 36 is greater than the pressure within the upper chamber 34 for a long enough period of time to open the poppet valve 79 against the resistance of the dash pot and establish communication between chambers 34 and 36, thus permitting the extension of the strut.

It is apparent from the above description that a landing gear system according to this invention may be designed so as to provide a large amount of damping to resist lateral vibration without incurring any ratcheting.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

We claim:
1. A landing gear system for an aircraft comprising at least two spaced struts each including a pair of co-operating telescoping members capable of relative axial movement, spring means in each strut resiliently urging said co-operating members axially relative to each other in one direction, wall means on each pair of co-operating members defining associated first and second chambers in each strut, said wall means including a piston on one of said members separating said chambers to cause the volumes of said chambers to vary inversely during relative axial movement of said members, valve means on each strut connected between said associated first and second chambers being normally closed isolating said associated chambers, a first fluid conducting means connecting said first chambers, a second fluid conducting means connecting said second chambers, and substantially incompressible liquid filling said chambers and conducting means normally maintaining the total volume of said first chambers constant and the total volume of the second chambers constant during relative axial movement of said members.

2. A landing gear system for an aircraft comprising at least two spaced struts each including a pair of co-operating telescoping members capable of relative axial movement, spring means in each strut resiliently urging said co-operating members axially relative to each other in one direction, wall means on each pair of co-operating members defining associated first and second chambers in each strut, said wall means including a piston on one of said members separating said chambers to cause the volumes of said chambers to vary inversely during relative axial movement of said members, valve means on each strut connected between said associated first and second chambers being normally closed isolating said associated chambers, a first fluid conducting means connecting said first chambers, a second fluid conducting means connecting said second chambers, a flow restriction in at least one of said fluid conducting means, and substantially incompressible liquid filling said chambers and conducting means normally maintaining the total volume of said first chambers constant and the total volume of the second chambers constant during relative axial movement of said members.

3. A landing gear system for an aircraft having a resonant frequency of vibration comprising at least two spaced struts each including a pair of co-operating telescoping members capable of relative axial movement, spring means in each strut resiliently urging said co-operating members axially relative to each other in one direction, wall means on each pair of co-operating members defining associated first and second chambers in each strut, said wall means including a piston on one of said members separating said chambers to cause the volumes of said chambers to vary inversely during relative axial movement of said members, a valve on each strut connected between said associated first and second chambers being normally closed isolating said associated chambers and being operable in response to a pressure in said second chamber greater than the pressure in said first chamber to provide communication between said associated chambers, damping means connected to said valve preventing operation thereof until the pressure in said second chamber is greater than the pressure in said first chamber for a period of time greater than one-half of a cycle of vibration, a first fluid conducting means connecting said first chambers, a second fluid conducting means connecting said second chambers, and substantially incompressible liquid filling said chambers and conducting means normally maintaining the total volume of said first chambers constant and the total volume of the second chambers constant during relative axial movement of said members.

4. A landing gear system for an aircraft comprising at least two spaced struts each including a pair of co-operating telescoping members capable of relative axial movement, spring means in each strut resiliently urging said co-operating members axially relative to each other in one direction, wall means on each pair of co-operating members defining associated first and second chambers in each strut, said wall means including a piston on one of said members separating said chambers to cause the volumes of said chambers to vary inversely during relative axial movement of said members, a valve on each strut connected between said associated first and second chambers being normally closed isolating said associated chambers and being operable in response to a pressure in said first chamber greater than the pressure in said second chamber by a predetermined amount, a first fluid conducting means connecting said first chambers, a second fluid conducting means connecting said second chambers, and substantially incompressible liquid filling said chambers and conducting means normally maintaining the total volume of said first chambers constant and the total volume of the second chambers constant during relative axial movement of said members.

References Cited in the file of this patent

UNITED STATES PATENTS

| | | |
|---|---|---|
| 2,093,486 | Schoepf et al. | Sept. 21, 1937 |
| 2,101,265 | Mercier | Dec. 7, 1937 |
| 2,184,202 | Tschanz | Dec. 19, 1939 |
| 2,263,770 | Greve | Nov. 25, 1941 |
| 2,299,613 | Cleveland et al. | Oct. 20, 1942 |
| 2,364,865 | Mattingly | Dec. 12, 1944 |
| 2,443,615 | Gruss | June 22, 1948 |
| 2,653,021 | Levy | Sept. 22, 1953 |

FOREIGN PATENTS

| | | |
|---|---|---|
| 249,995 | Switzerland | May 18, 1948 |
| 582,608 | Great Britain | Nov. 21, 1946 |
| 650,188 | Germany | Sept. 13, 1937 |
| 751,475 | France | June 19, 1933 |
| 819,026 | France | June 28, 1937 |

OTHER REFERENCES

"Flight," December 18, 1953, p. 815.